Jan. 24, 1961    D. A. RICHARDSON ET AL    2,969,210
RESCUE DEVICE

Filed June 30, 1959    2 Sheets-Sheet 1

INVENTOR.
David A. Richardson
BY Hugh A. Mc Cafferty

Arthur L. Collins
ATTORNEY

United States Patent Office 2,969,210
Patented Jan. 24, 1961

2,969,210

RESCUE DEVICE

David A. Richardson, Broomall, and Hugh A. McCafferty, Upper Darby, Pa., assignors, by mesne assignments, to the United States of America as represented by the Secretary of the Navy Filed June 30, 1959, Ser. No. 824,166

2 Claims. (Cl. 244—137)

This invention relates to an aircraft personnel rescue device and apparatus designed for picking up personnel, incapacitated or otherwise, primarily from the water by helicopter.

An object of this invention is to provide a means for rescuing an unconscious or disabled person from the water without the necessity of sending a crew member down the rescue hoist to render assistance.

Another object of this invention is to provide a rescuing means which is easy to assemble and disassemble within the helicopter.

Yet another object includes the combination of a drogue attached to the open side of a net for opening the net and tilting the open side thereof downwardly thereby providing a larger net area for making the rescue.

Other objects and many of the attendant advantages of this invention will be readily appreciated as the same becomes better understood by reference to the following detailed description which is considered in connection with the accompanying drawings wherein:

Fig. 1 is a diagrammatic front view of a helicopter rescue aircraft embodying our invention. The full lines illustrate the rescue device in the closed position. The dotted lines show it in its open position and in addition indicate the direction of travel of the drogue during the rescue operation.

Figure 1:
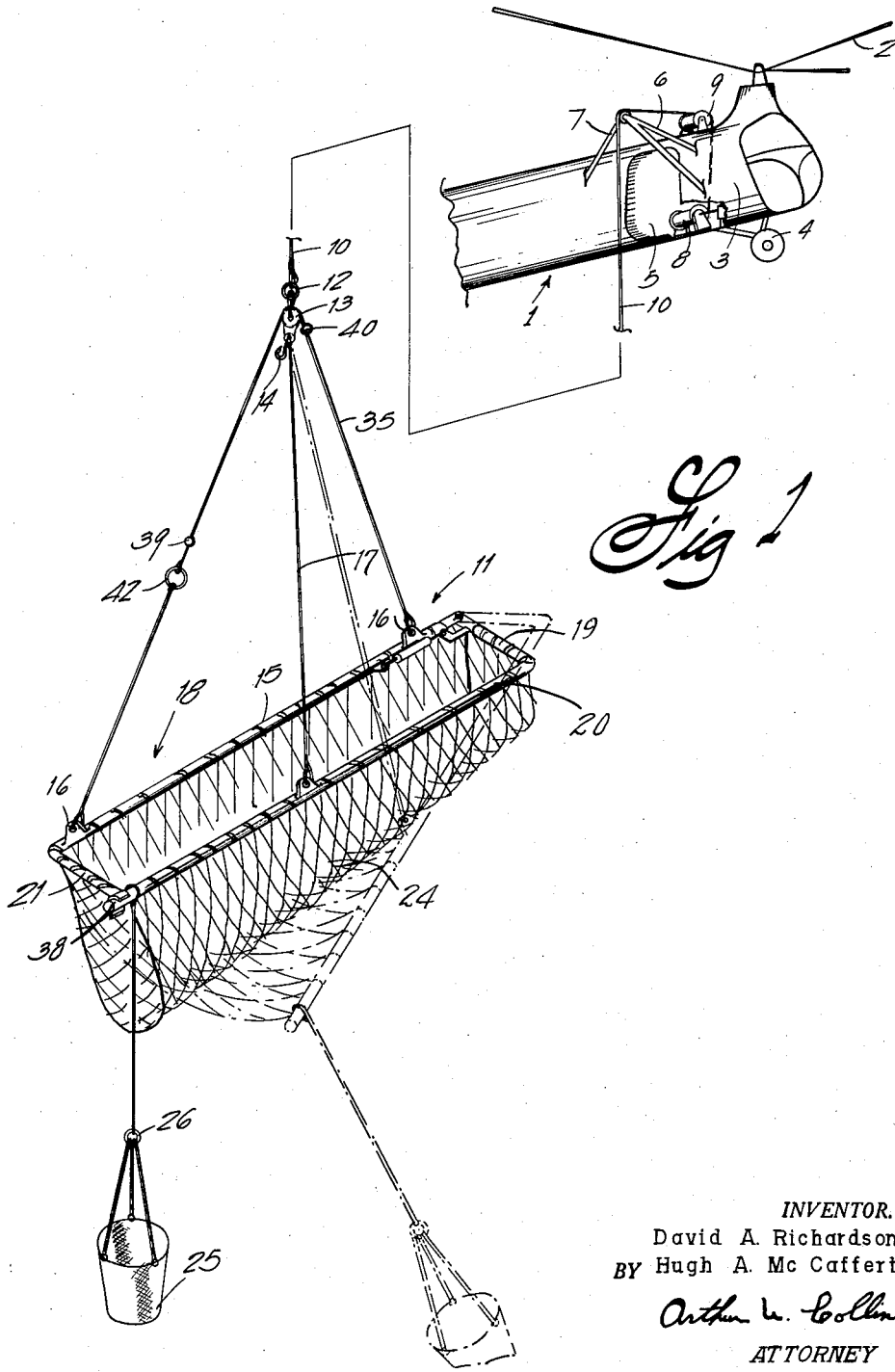

Referring particularly to Figure 1, the reference numeral 1 indicates a helicopter type of air rescue aircraft having the usual rotor 2, fuselage or cabin portion 3, and landing gear 4. A side entrance opening or door 5 is located in the forward portion of the fuselage 3.

A crane or boom 6 is mounted with its lower end or foot secured on the side of the fuselage 3, the boom 6 inclining upwardly and outwardly from its lower end with its outer end disposed to swing substantially horizontally over the vertical center through the side opening 5.

The outer end of the boom may be supported in any conventional manner as by a brace 7.

A power operated cable winch 8, being reversibly driven by any suitable control means within the helicopter in a conventional manner, has a cable drum 9 and a lifting, lowering, and towing cable 10 thereon reeved over a suitable pulley at the outer end of the boom 6, and has our improved air-rescue apparatus 11 attached to the lower end of the cable 10 by a main lifting or primary ring 12.

Suspended from the ring 12 is a pulley block 13 having a swivel hook 14 attached thereto. A continuous cable 35 rides on the cable pulley 13 and has its ends connected on the opposite sides of the pulley to a member 15 of frame 18 by eyebolts 16 or the like. A centering cable 17 is attached to the frame to afford stability to the device when it is being lifted up from the water.

The frame 18 consists of four tubular members 15, 19, 20 and 21, which are arranged to form a rectangle when the rescue device is in the closed position shown in Figure 1. Tubular members 15 and 19 are joined together by a hinge 22. The net, 24, is attached to the rectangular frame 18 in any suitable conventional manner.

A drogue or "sea anchor" 25 is attached to tubular member 20 by a bridle member 26. As the rescue net is slowly towed through the water, the drag produced by the drogue will exert a steady pulling force on one end of tubular member 19 thereby opening the rescue net to provide a larger net area to make the rescue.

Figure 2:
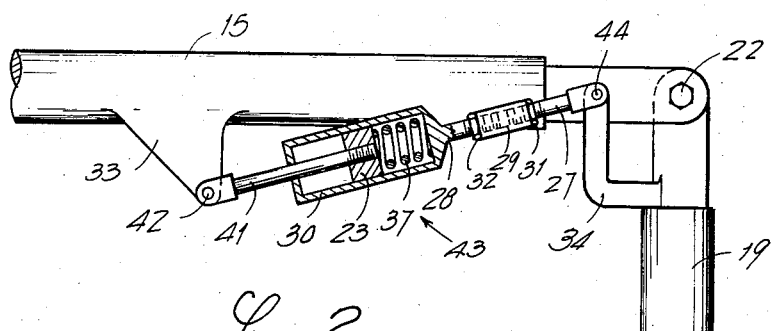
Figure 2 is an enlarged and detail view of a spring and an over-center locking hinge arrangement showing the rescue device in the closed position.
Figure 3:
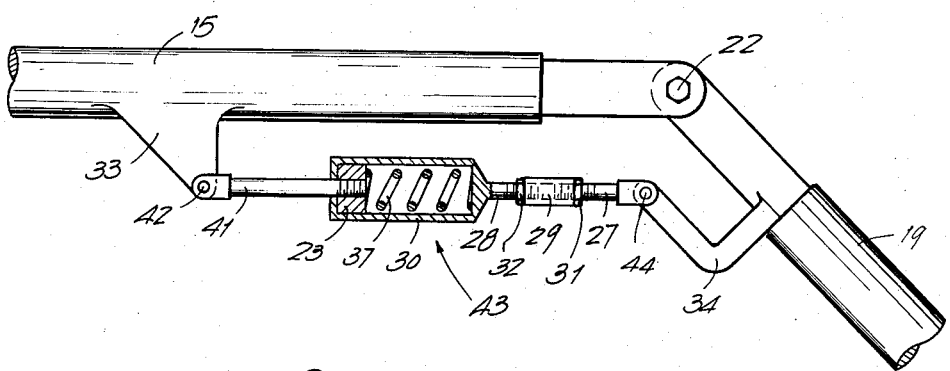
Figure 3 is a view similar to Figure 2 showing the spring and hinge arrangement when the rescue device is in the open position.

Referring more particularly to Figures 2 and 3 of the drawing, the shaft 27, which is pivotably secured to the L-shaped lug 34 on member 19, is adjustably secured to the shaft 28 preferably by means of the turnbuckle 29. Locking nuts 31 and 32 on either side of the turnbuckle secure it in its desired adjusted position. The cylindrical housing or the like 30 is integrally secured to the end of shaft 28, and the piston 23 disposed therewithin is pivotably connected to the lug 33 on member 15 by means of the piston rod 41. The helical spring or the like 37 normally biases the piston 23 to the left within the housing 30. As will be more apparent hereinafter the angular disposition and dimensions of the lugs 33 and 34 and the yieldable link assembly 43 therebetween are such as to provide an over-center locking arrangement as the frame is operated from its full open to full closed position. When the rescue device is in the fully closed position as shown in Fig. 1, the pivotal connection 44 between the yieldable link assembly 43 and the L-shaped lug 34 of tubular member 19 is in an over-center relationship with respect to an axis drawn through the pivotal connection 42 of piston rod 41 to lug 33 and the pivotal connection 22 of the tubular member 15 to tubular member 19. The over-center arrangement of the yieldable link assembly 43 provides the means for holding the rescue device in the closed position until sufficient force is exerted by the drogue 25 to override the locking action of the toggle spring and thereby open the net. Thus, the point, at which the spring 37 within the cylinder housing 30 is compressed its greatest amount, is reached when the frame occupies a predetermined point between its full open and full closed positions. When the rescue device is in the open position, the toggle spring acts to maintain the rescue device in the open position while it is being maneuvered under the rescue at which time the drogue may be inoperative in exerting a pulling force.

*Operation*

As before set forth, a primary object of the invention is to allow the operating personnel of a helicopter to retrieve or pick up incapacited personnel from the sea without the necessity of sending a crew member down the rescue hoist.

The pilot of the helicopter 1 hovers the aircraft at the lowest possible altitude directly above the personnel to be rescued. The co-pilot readies the device for a rescue operation in a minimum amount of time. The tubular member 15 is secured to the cable 35 by means of the eyebolts 16. The centering cable 17 is attached to the member 20 of the frame 18. The co-pilot operates the winch 8 to play out the cable 10 to lower the device into the water. As the rescue net is slowly towed through the water, the drag produced by the drogue 25 will exert a steady pulling force on one end of member 20. When this force becomes sufficient enough to overcome the restraining force of the spring 37, the hinge 22 will be opened. The rescue net 24 is then stretched to a taut position providing a larger net area for making the rescue.

The toggle effect of the yieldable link assembly between lugs 33 and 34 as hereinbefore stated will act in conjunction with the force of the drogue 25 to hold the net in an open position until the rescue operation is completed.

The weight of the rescuees, when the device is hoisted clear of the water, acts to overcome the restraining action of the spring 37 and to return the spring to its over-center locked position when the end of member 20 engages the U-shaped fitting 38 at the end of member 21.

Stops 39 and 40 on the continuous cable 35 limit the degree of tilt of the rescue device so that the rescuees will remain safely in the net during the hoisting operation. When the rescuee is located nearer the opening end of the device, the stop 40 will come into contact with cable pulley 13 thereby maintaining the rescue device in a substantially horizontal position. However, when the rescuee is located nearer the closed or hinged end of the device, the rescue device will automatically tilt to the position limited by stop 39 coming into contact with cable pulley 13 whereby the secondary ring 42 is directly under the primary ring 12. When the device is hoisted up to the hatch opening 5 of the helicopter 1, the device, if not already tilted by virtue of the rescuee being nearer the closed or hinged end, is manually tilted and the secondary ring 42 is attached to the swivel hook 14 thereby holding the device in the tilted position and easing the work required to bring the device up through the open hatch and into the cabin area.

Obviously many modifications and variations of the present invention are possible in the light of the above teachings. It is therefore to be understood that within the scope of the appended claims the invention may be practiced otherwise than as specifically described herein.

What is claimed is:

1. In an aircraft personnel rescue device for rescuing an unconsicous or disabled person from the water without the necessity of sending a crew member down the rescue hoist to render assistance, said device comprising a cable adapted to be played out of and retracted into the aircraft; a pulley block connected to the lower end of the cable; a rectangular frame; a hinge for joining two sides of the rectangular frame together; a second cable riding on the pulley and having its ends connected to opposite ends of the frame; a net attached to the frame; locking means connected to the hinge for holding the frame in a closed position until a sufficient force is exerted upon the frame to open it and for maintaining the frame in an open position until a sufficient force is exerted upon the frame to close it whereby a larger net area is provided for making the rescue; drag means connected to the open side of the frame for tilting the net downwardly when the net is submerged in a body of water and dragged therethrough by the cable.

2. The combination of claim 1 wherein the locking means comprises lug means secured to one side of the frame; a first shaft pivotably connected to the lug; a second shaft; a housing integrally secured to one end of the second shaft; a piston disposed within the housing; means for pivotably connecting the piston to an adjacent side of the frame; a biasing means located with the housing; and means for adjustably connecting the first shaft with the second shaft whereby an over-center locking arrangement is provided for holding the rescue device in a closed position until sufficient force is exerted by the drag means to open it.

References Cited in the file of this patent

UNITED STATES PATENTS

| | | |
|---|---|---|
| 1,851,305 | Fisher | Mar. 29, 1932 |
| 2,683,321 | Faber | July 13, 1954 |
| 2,700,781 | Smith | Feb. 1, 1955 |
| 2,738,939 | Johnson | Mar. 20, 1956 |
| 2,780,020 | Butler | Feb. 5, 1957 |